Matthew D. Mann Jr.
Helmuth G. Schneider Inventors
By W. H. Smyers Attorney

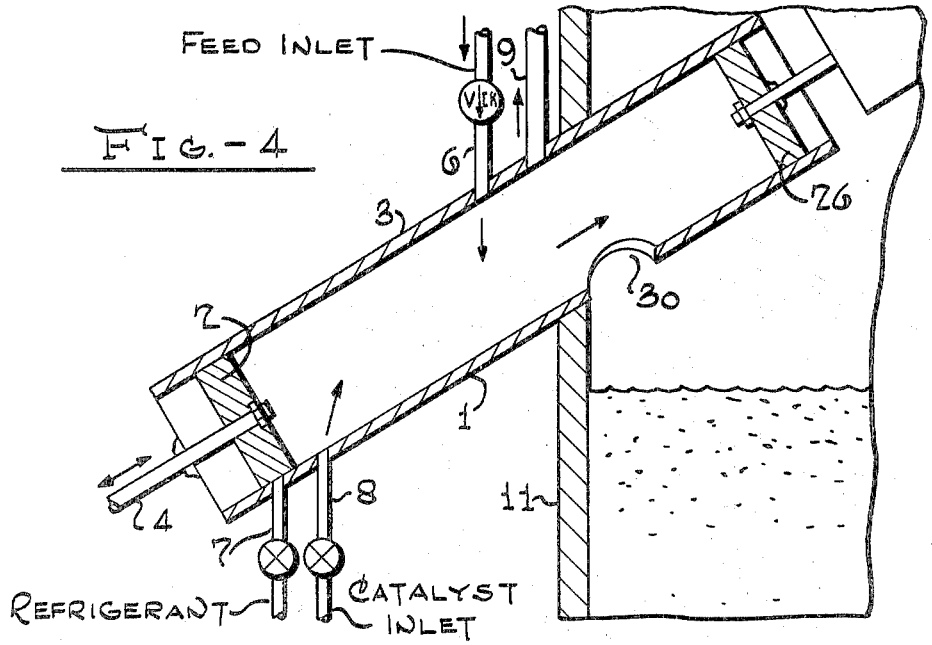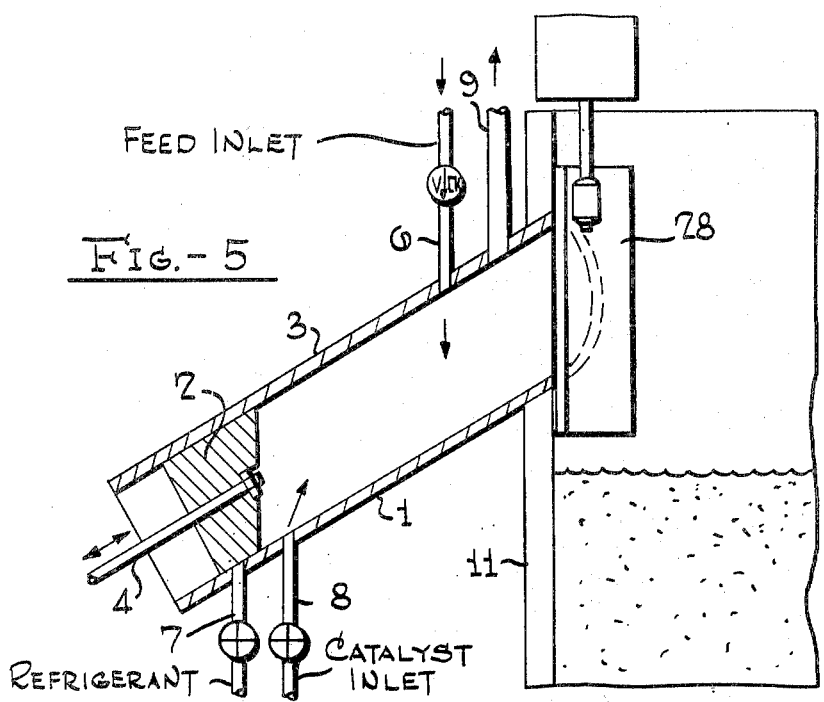

United States Patent Office 2,709,642
Patented May 31, 1955

2,709,642

CHEMICAL REACTOR

Matthew D. Mann, Jr., Roselle, and Helmuth G. Schneider, Westfield, N. J., assignors to Esso Research and Engineering Company, a corporation of Delaware Application December 3, 1951, Serial No. 259,664

4 Claims. (Cl. 23—285)

This invention relates to apparatus and processes for low temperature polymerizations; relates particularly to semi-continuous polymerization devices and processes; and relates especially to procedures in which a tubular reactor chamber having a movable bottom is used for a polymerization procedure; the reaction mixture being delivered thereto, brought to a desired temperature, polymerized to any desired percentage completion of the reaction and the polymerization mixture discharged from the reactor by movement of the bottom, the reaction mixture being discharged into any desired type of receptacle.

It has been found that various of the isoolefins and especially isobutylene, can be polymerized; or copolymerized with a wide range of other olefins and unsaturates; by cooling the material to a reduced temperature and treating it with a Friedel-Crafts catalyst. Many forms and variants of this reaction have been worked out to produce such substances as the simple polymer of isobutylene, the copolymer of isobutylene with a multi-olefin having from 4 to about 14 carbon atoms per molecule; the copolymer of the octene known as dimer with a multi-olefin such as butadiene, the copolymer of isobutylene and styrene, and a considerable number of other olefinic polymers. Various types of apparatus have been produced and tried for this polymerization procedure, but none of them is wholly satisfactory. That is, many of the reactions have been carried out in batch type reactors or in continuous polymerization reactors in which a steady flow of polymerizate is delivered to the reactor and a steady stream of partially polymerized olefin overflows from the reactor.

All of these procedures are, however, unsatisfactory because of the fact that the material must be handled as a fluid through pipes, with the aid of pumps, and the like. This requirement limits the percent yield, on the raw material delivered, to values usually between 20% and 50%, since otherwise the polymer drops out as a solid and plugs the lines and other equipment. Similarly, if carbon dioxide is used as a refrigerant, very sharp limitations are imposed upon the obtainable molecular weight, since, if the temperature is brought to the required low value, considerable amounts of solid $CO_2$ drop out in the reactor and the material ceases to be a flowable liquid. Alternatively, if liquid refrigerants such as propane or ethane or ethylene are used in the polymerization mixture, they precipitate the solid polymer and the material then ceases to be a flowable liquid and becomes inordinately difficult to handle.

The requirement for relatively large quantities of reactant or other material such as diluent in the reactor makes temperature control extraordinarily difficult, and makes it practically impossible to prevent local overheating of the polymerization mixture in many spots. Similarly, the low conversion level means that a relatively very large proportion of material must be flashed off from the polymer at some stage in the processing, and this material must be recycled through compressors which prepare the material for fractional distillation and other treatments in liquid form. When such a procedure is under way, it must be done slowly to avoid surge loads on the compressors and this time delay allows a great deal of "after polymerization" producing an undesirable widening of the range of molecular weight obtained in the finished polymer which, in turn, means a poorer quality of product and when the polymer is used for a lubricant addition agent, the stability is seriously reduced. Similarly, the procedure means that a relatively very large portion, often from 60 to 80% of the raw material must be recycled, which is only possible after a compressing and purification step. This means an unduly high cost and in effect, a major percentage loss of raw materials from the reaction.

Also, all of the procedures for making solid polymer tend to precipitate solid polymer upon the walls of the reactor chamber, unless there is a solvent present in sufficient quantity to keep the polymer in solution. In this instance, however, the maximum concentration of polymer in the solution which is flowable usually is below 8 or 10 per cent, making necessary the use of very large quantities of solvent. Alternatively, however, a non-solvent operation is conducted to obtain a slurry of solid polymer particles in a carrying liquid, in which as much as 20 to 25% of solid can be carried, but, a substantial portion of the polymer is unavoidably precipitated upon the wall of the reactor, greatly slowing down the rate of heat transfer through the walls to the refrigerant jacket and preventing the maintenance of the necessary low temperature in the reaction mixture. The removal of this adherent layer of polymer is extremely difficult since the quantity is relatively large, solubility low and its physical properties those of a tough, elastic, leathery material, difficult to remove by hand and even more difficult to dissolve.

The present invention provides a type of equipment in which none of the polymer is handled in pipes or with pumps, and in which the polymer is forcibly transferred from the polymerization reactor to subsequent processing apparatus and processing steps, thereby making it possible to carry the conversion to any desired stage up to 100% polymerization.

The apparatus of the present invention consists of a tubular reactor, preferably mounted at an angle to the vertical, one end of the tubular reactor being entered into and connected to a suitable receiver, the other end, the bottom end being closed by a piston type closure; the top being left open if there is no water vapor in the product receiver, or closed by an appropriate cover or secondary piston as desired. Appropriate supplies of an olefinic feed material, catalyst and refrigerant are provided and a vapor take-off is likewise provided for the removal of volatilized material. Various types of reactant stirring means may be provided, if desired. The reactor may also be jacketed with an appropriate refrigerant, if desired, or internal refrigeration may be relied upon entirely. A plurality of such reactor cells may be connected to a single product receiver, the several reactors being discharged successively into the receive by appropriate movements of the pistonlike bottoms. Sufficient power is readily applied to the piston to clear the reactor of all solid material and no problem of reactor fouling, as by the adhesion of polymer to the surface, occurs, since it is scraped off at regular intervals.

The apparatus may consist of a single polymerizer cylinder connected to a single receiver, or it may consist of several reactors connected to a single tank, or to a plurality of tanks. When more than a single polymerizer is used, it is usually desirable to put clock-controlled automatic charging and discharging equipment, usually with thermostat controlled refrigeration means in order to maintain in the flash tank, or receiver, a relatively constant slurry content.

The receiver may contain warm water, if desired, to provide a prompt inactivation of the catalyst, or the receiver may contain a light naphtha, preferably warm, to volatilize out as much as possible of the residues of unpolymerized material, if any, or it may contain a heavy oil for the direct production of an oil solution of the polymer for improved lubricant production.

Thus, the invention prepares an olefinic material, cools it to a temperature below room temperature, usually within the range between about 0° C. and about —164° C., although for some reactions, temperatures as high as +10° C. are useful, polymerizes the mixture in a tubular reactor containing a movable bottom by the application of a Friedel-Crafts type catalyst, either as such or in solution in a low-freezing, non-complex-forming solvent, carrying the polymerization reaction to any desired stage of percentage utilization of the olefinic material present, preferably ranging from 15 or 20% to 80% or 100%, discharges the polymerized material into a receiver by movement of a piston type reactor bottom, inactivates the catalyst in the receiver, or volatilizes out the unpolymerized residuals and diluent (or both), to form either a slurry of polymer or a solution of polymer which may thereafter be further processed or used, as desired. Other objects and details of the invention will be apparent from the following description when read in connection with the accompanying drawing, wherein Fig. 1 is a diagrammatic view of apparatus and devices of the invention for practicing the process of the invention;

Fig. 4 is a side view of the reactor system according to the invention, showing a reactor member having a piston type closure for the upper end of the reactor; and Fig. 5 is a side view of a similar reactor having a sliding cover member for the reactor.

Figure 1:
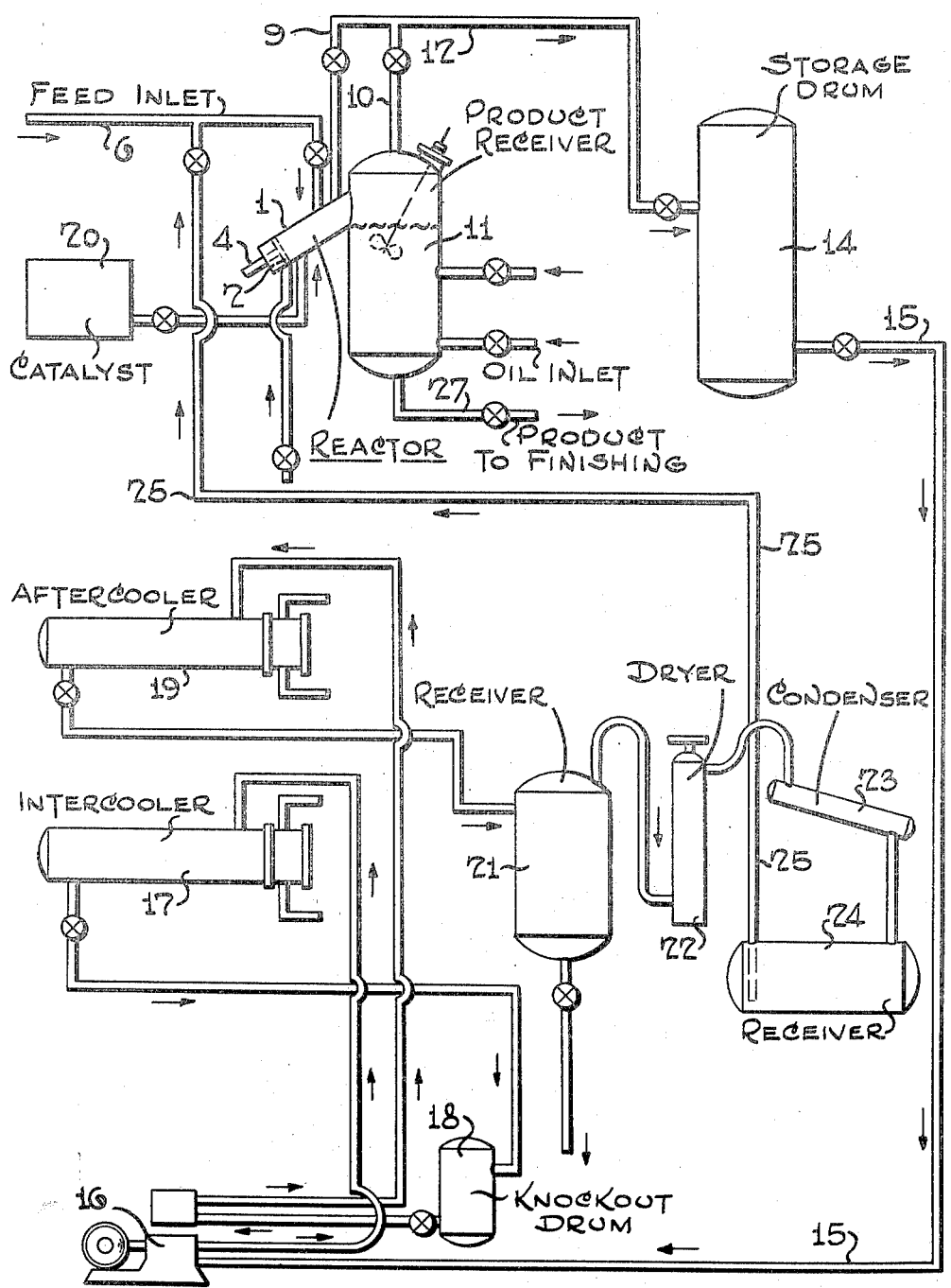
Figure 2:
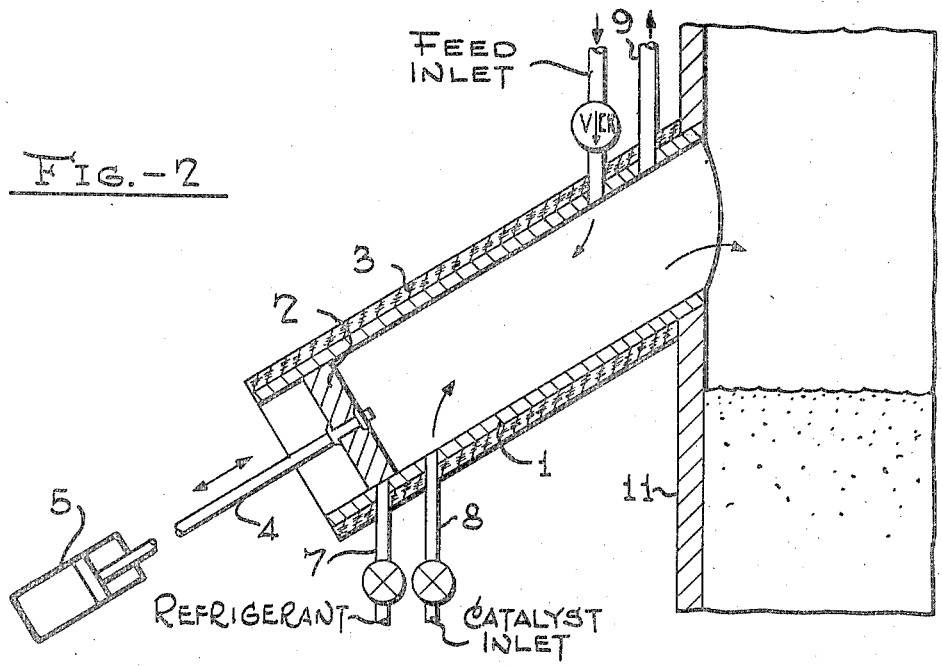
Fig. 2 is a side view, partly in section, of the reactor member of the invention.
Figure 3:
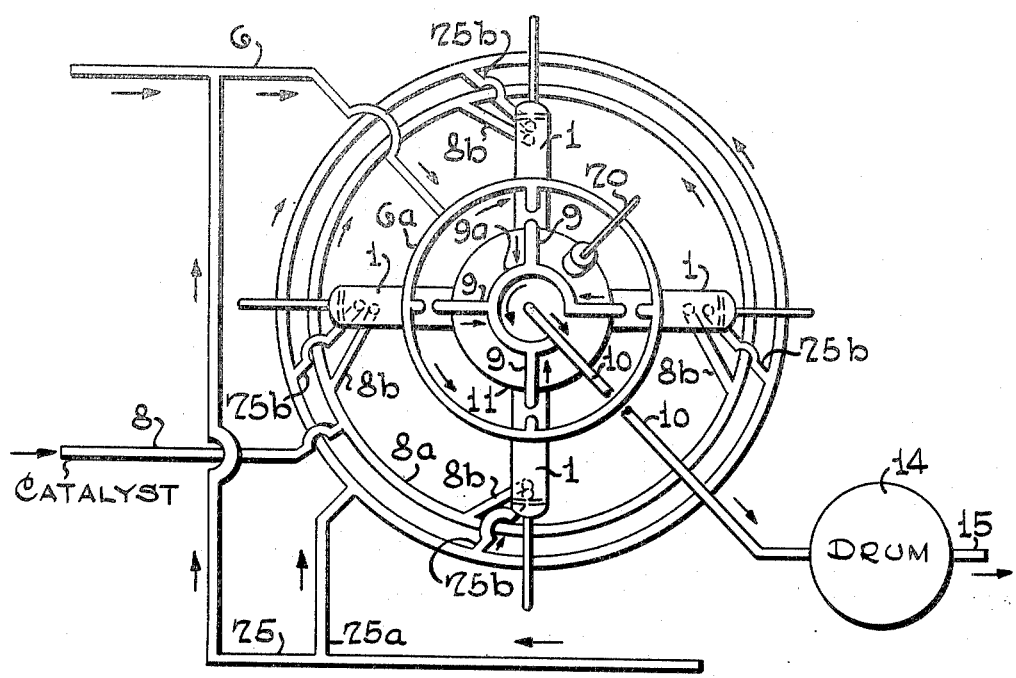
Fig. 3 is a top view of the reactor system of the invention showing a plurality of reactor members cooperating with a single receiver member.

The apparatus of the invention consists of a tubular reactor member 1, preferably consisting of a steel cylinder having a diameter ranging from a small number of inches to several feet, and a length from one to ten times the diameter. Within the tubular reactor 1, there is positioned a piston member 2, adapted to sweep over the entire length of the reactor 1. The tubular reactor 1 may be equipped with a jacket 3 which may take the form of a heat insulating layer such as cork, or asbestos or cotton wadding or the like, or may consist of an annular jacket formed by a second metal shell, the interspaces between being filled with an appropriate refrigerant, the refrigerating jacket also preferably having a heat insulating layer on the outside. The piston 2 is provided with a piston rod 4 and a driving means 5. The driving means may consist, as desired, of a rack and pinion with a driving motor or may consist of a hydraulic cylinder with oil or water; or a pneumatic cylinder with air as the driving power; any convenient means for reciprocating the piston rod 4 being suitable. The reactor 1 is also provided with a tubular inlet 6 which is connected to an appropriate supply of polymerizable material. A second inlet tube 7 is provided through which a liquid refrigerant may be delivered directly to the polymerization mixture; a third tube 8 is likewise provided for the delivery of catalyst to the reactor, and a fourth tube 9 is provided for the discharge of vaporized materials.

The tubular reactor 1 is preferably positioned with the axis at an angle from the vertical, the angle varying from about 30° above the horizontal to about 75° above the horizontal, depending upon the particular character of product receiver to which it is to be connected. The upper end of the tubular reactor 1 then enters the product receiver 11. The product receiver 11 may consist of a tubular tank or boiler type of structure with the walls more or less nearly vertical. However, it is not necessary that the walls of the receiver be vertical since the receiver may be made with walls departing from the vertical or even in some instances may be dome-shaped.

(Alternatively, the reactor 1 may be positioned vertically, or with only a small departure from vertical position of the axis, and the end may be entered into a product receiver in the form of a cylinder more or less nearly horizontal, although, for most purposes, a receiver mounted on a slope of from 10° to 30° is preferable if the reactor 1 is nearly or quite vertical; it being necessary that sufficient slope be provided to permit the polymer to roll or flow down the incline.)

A separate product receiver may be used for each polymerizer or a plurality of polymerizers may enter a single product receiver 11; from two to a dozen or more reactors being positioned to deliver polymer into the receiver. The receiver 11 preferably is connected through a pipe member 12 to a storage drum 14, which in turn is connected through a pipe 15 to a compressor 16. The compressor may be a single or double stage; in the latter case, the first stage is connected to an inter-cooler 17 and a knock-out drum 18, and the second stage is connected to a second or after cooler 19 from which the compressed and condensed material is delivered to a receiver 21, which may be merely a tank, or may include an elaborate purification, distillation and separation equipment. In either case, a dryer member 22 is desirably included and a condenser member 23 and receiver 24 may be used. The purified olefinic material in the receiver 24 may be diluted with additional raw material and the various components of the polymerization mixture are then delivered through a pipe 25 to the feed line 6, along with fresh raw material for make-up.

The catalyst is prepared and stored in a drum member 29 ready for delivery through the catalyst feed line 8.

If the material in the receiver 11 is anhydrous, no cover of separator is required between the reactor 1 and the receiver 11; this being the case, when warm naphtha or warm oil is used in the receiver 11. When, however, the receiver 11 contains water, the vapor pressure of water within the upper portion of the receiver is sufficiently high to carry water vapor into the reactor 1, where it is condensed by the cold walls and may interfere with the catalytic action. Accordingly, a closure of some sort is required for the upper end of the reactor 1. This make take the form of a second piston 26 moving in the upper end of the cylindrical reactant 1, opening and closing a discharge port 30. By making the faces of the two pistons 2 and 26 smooth and flat, they may be brought closely together squeezing out any polymer adhering to the lower piston and any moistening between them; whereafter the two pistons may be moved backward until the port 30 is closed, and then the piston 2 may be moved to the bottom of its stroke, preparing the reactor for another polymerization reaction.

Alternatively, the upper end of the reactor 1 may be closed by a sliding cover as shown in Figure 5; in which instance the face of the piston 2 is preferably given a shape closely similar to the contours of the receiver 11, so that at the top of its stroke, the piston tube is scraped by the sliding cover 28 to remove any adherent polymer from the piston and to permit return of the piston to the bottom of its structure without drawing in any moisture from the receiver 11.

In practicing the process of the present invention, the desired reaction mixture is first prepared. This may, if desired, consist merely of a $C_4$ cut as received from the refinery. In this case, the material contains approximately 15% of isobutylene, from 25% to 40% of normal butenes with the remainder largely butane and traces of other $C_3$ and $C_5$ hydrocarbons. Preferably, however, the $C_4$ cut is purified and the isobutylene separated out in a purity ranging from 96 to 99.5%. For most of the reactions in which this reactor process is applicable, relatively pure olefinic material is the most important component. When pure isobutylene is used, a relatively high molecular weight polybutene is obtained, and when the simple $C_4$ cut, either as such or fortified with additional isobutylene is used, the product obtained is a moderately high molecular weight polybutene of a type especially suitable for viscosity index improver in lubricants.

Alternatively, isobutylene with a wide range of copolymerizates may be used. If isobutylene of a purity ranging from 96% to 99.5% is used and small amounts of a multi-olefin having from 4 to 14 carbon atoms per molecule such as butadiene, isoprene, piperylene, dimethyl butadiene, dimethallyl, myrcene, the various unsaturated ethers, and the like, are added, an excellent substitute for caoutchouc (the so-called "natural rubber") is obtained. For this product, the isobutylene preferably is present in major proportion and the multi-olefin present in minor proportion of the unsaturated material present. It may be noted that a copolymer is obtainable with practically any multi-olefin without regard to the presence of substituents of any kind, although with some substituents, moderately high molecular weight multi-olefins are much superior.

Diolefins, such as 2-methyl 3-butyl-butadiene 1,3 or 2-methyl 4-nonyl butadiene 1,3 are excellent multi-olefinic copolymerizates. Experience to the present indicates that the multi-olefins need not be conjugated and it does not appear that the position of the unsaturation is necessarily vital. It is found, however, that multi-olefins with the unsaturation between the first and second carbon atoms and a methyl substituent on the second carbon atom copolymerize more smoothly and more easily than do the linear chain compounds, or compounds in which the unsaturation is in the second position or higher. Also it does not appear that the presence of inorganic substituents prevents the copolymerization, especially when there are five or more carbon atoms present in the monomer. This is especially true of the doubly unsaturated ethers, whether they are the simple ethers or mixed ethers. Accordingly, tests show that multi-olefins having carbon atom numbers at least four to as high as 14 or more are satisfactorily polymerizable and the tests indicate that there is no necessary limitation on the number of carbon atoms, on the position of the ethylenic double linkages or on the substituents, although, of course, some make polymers which are superior for one purpose and others make polymers which are superior for other purposes.

A wide range of interesting resins is obtainable by the use of mixtures of isobutylene and styrene or the various substituted styrenes such as chloro styrene, bromo styrene, and the like. For this reaction, the range of proportions may vary between significant proportions of one, with significant proportions of the other, about 0.1% to about 1% being the minimum significant proportion.

Alternatively, another very valuable, relatively hard resin is obtainable by the copolymerization of the multi-olefins with various of the olefins, other than isobutylene. For this reaction, any of the normal olefins having from 3 to about 20 carbon atoms per molecule and any of the isoolefins having from 5 to 20 carbon atoms per molecule are usable and any of the multi-olefins above listed having from 4 to 20 carbon atoms per molecule are useful. This reaction preferably is conducted at temperatures below room temperature.

The material may be used simply as the pure olefin or pure olefinic mixture or it may be diluted with one or more of a wide range of substances, the principal requirement of the diluent being that it has a freezing point below the polymerization temperature and that it be free from any inactivating effect on the catalyst. Appropriate diluents are such substances as the mono or poly halo alkyls, ethyl and methyl chloride, ethylene dichloride, chloroform, and the like being particularly useful. Also such substances as carbon disulfide and the lower boiling hydrocarbons are also particularly useful. Accordingly, any substance which is liquid at the polymerization temperature and free from interference with the catalyst, which does not copolymerize with the unsaturates present, may be used as a diluent.

The olefinic material whether a pure olefin, an olefinic mixture or a diluted olefinic material is preferably precooled before delivery to the reactor and the individual components may be cooled and then mixed or they may be mixed under pressure, if desired, and cooled after mixing. The temperature to which they are cooled usually runs within the range between $+10°$ C. and $-164°$ C., depending upon the type of olefinic material, and particular reaction, and the material desired. If an elastomer is to be made, the temperature range preferably lies between $-40°$ C. and $-103°$ C. Temperatures below $-103°$ C. are usually undesirably low, although for some reactions, temperatures ranging down to about $-125°$ C. are desirable, and it is only very occasionally that temperatures as low as $-164°$ C. are useful. If a hard resin is to be made, the temperature range usually lies between about $+10°$ C. and $-35°$ C. The cooling may be obtained by a refrigerating jacket on the mixing or storage containers and the reactor, in which case any low boiling refrigerant substance may be used. Particularly suitable jacket refrigerants are ammonia, liquid ethylene, liquid ethane, solid or liquid carbon dioxide, sulfur dioxide, rarely liquid methane, more frequently liquid propane, occasionally liquid butane, liquid ethyl or methyl chloride or the low boiling fluoro alkyls or fluoro chloro alkyls. These compounds may be used pure or mixed, under pressure or vacuum, as desired, to obtain a suitable temperature.

Alternatively, an internal refrigerant may be used, for which purpose such substances as the lower boiling mono or poly halo alkyls are desirable or the lower boiling hydrocarbon substances such as liquid methane, liquid ethane, liquid ethylene, liquid propane or the various low boiling fluoro halides are also useful as well as liquid or solid carbon dioxide. One or more of these internal refrigerant may be added, the choice depending upon the temperature desired. It may be noted that a distinction is made between an internal refrigerant and a diluent although the internal refrigerant usually serves as a diluent as well.

For polymerization catalyst, there is used a Friedel-Crafts type catalyst. This catalyst, if fluid, may be used as such, if desired, but usually superior results are obtained if it is used in solution in a low freezing, non-complex-forming solvent. For the Friedel-Crafts catalyst, any of those disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. Of the substances listed, boron trifluoride is gaseous at the reaction temperature and titanium chloride is liquid at the reaction temperature, and these two may be used directly. The others are solid at the reaction temperature and their solubility in the reaction mixture is so low that they are useless in the solid form.

In order to use the solid catalysts, and preferably with the fluid catalyst, there is used a low-freezing, non-complex-forming solvent. The preferred solvents are such substances as the mono or poly halo alkyls including ethyl or methyl chloride, methylene dichloride, chloroform, ethylene dichloride, and the like. Another excellent solvent is carbon disulfide. With some of the catalysts, the medium boiling hydrocarbons are also excellent solvents. Such substances as liquid ethane, liquid propane, liquid butane, pentane, hexane, and the like are also excellent solvents. For most of these reactions, the preferred catalyst is aluminum chloride in solution in ethyl or methyl chloride, or boron trifluoride in solution in liquid ethane or liquid propane. The essential requirements for solvent are that it be low-freezing and non-complex-forming. To be low-freezing, it is essential only that the solvent have a freezing point below 0° C. To be non-complex-forming, it is essential only that there shall not separate from the solution on evaporation of the solvent a compound containing both the Friedel-Crafts catalyst and solvent.

The cold olefinic material is then delivered through the pipe 6 to the reactor 1 where it is held at the desired temperature. The catalyst is then delivered through the pipe 8, preferably in the form of a relatively fine, high pressure jet, under sufficient pressure to give a substantial stirring action. The heat of reaction is absorbed by the vaporizable refrigerant, whether it is present as an internal refrigerant or present as a refrigerating jacket, and a portion of the vaporized refrigerant is discharged through the pipe 9, and another portion through the pipe 10 leading from the receiver 11 to the surge drum 14. The reaction may proceed practically instantly or it may proceed after a delay or induction period of from a few seconds to many minutes. In any event, the amount of polymerization is to a considerable extent controllable by limitation of the catalyst delivered through the pipe 8. When the desired stage of reaction is reached, the piston 2 is moved upward discharging the whole of the contents of the reactor 1 into the product receiver 11.

The receiver 11 may contain such substances as light naphtha or a moderately heavy oil or a slurry of lime in oil, or the like. Alternatively, the receiver may contain a substantial quantity of warm or hot water which may also contain lime, or soda, or other alkaline substances if desired. In the event that a hydrocarbon material is used in the product receiver, the polymer is rather promptly dissolved in the hydrocarbon, and the unpolymerized olefins and any diluent or refrigerant which may be present is volatilized and discharged through the pipe lines 10 and 12 to the drum 14 and then through pipe 15 to the compressor 16. The product receiver 11 is preferably equipped with a powerful stirring means 20, as shown, to facilitate the solution of the polymer in the hydrocarbon. When the solution is complete, it is discharged through a pipe 27 for packaging or further processing. If a slurry of lime or soda or other substance in a hydrocarbon is used in the receiver 11, the solution is preferably filtered to remove the lime which serves to inactivate the catalyst as soon as solution begins. If a low molecular weight polymer is made, the solution may be made with light lubricating oil as the solvent, and, after filtration to remove lime or soda, the material may be packaged ready for shipment and used as a lubricating oil thickener and V. I. improver. If a light naphtha is used in the product receiver, and the substantially pure polymer is desired, the solution may be delivered through the pipe line 27 to a flashing system, as shown by Tyson in Patent No. 2,235,127.

Alternatively, if a substantially pure high molecular weight solid polymer is desired, it is usually preferable that the product receiver contain a substantial quantity of warm water. When the polymer reaction mixture is discharged by movement of the piston, into the warm water in the receiver 11, any unpolymerized olefinic material and any diluent are promptly volatilized and driven out through the pipe line 10 and the polymer forms a more or less fine grained slurry in the receiver, the stability of which may be considerably improved by the presence of substantial quantity of zinc stearate, as shown in the copending application Serial No. 428,834 filed January 30, 1942, by Per K. Frolich, now Patent No. 2,456,265, the subject matter of which is herewith incorporated in the present application as being part of the present invention.

When a slurry in water is prepared, it likewise may conveniently be discharged through the pipe 27 to a filter or to a centrifuge or to a strainer or other appropriate device for separating the polymer from the water. The polymer may then be processed in any desired manner.

It should be noted that when warm water is used in the receiver 11, it is usually desirable to provide a removable cover over each reactor to prevent condensation of water vapor in the cold reaction mixture; this cover being reasonably vapor-tight, and being applied at the close of a discharge cycle to prevent passage inward of water vapor.

In some instances it is desirable to avoid use of diluent solvent or slurrying liquid of any sort; in which instance discharge pipe 27 may be removed and the opening in the bottom of the receiver 11 closed by the intake structures of a worm type extruder. In such instances it is usually desirable to provide a source of heat at the bottom of the receiver 11 to vaporize as much as possible of the diluent and uncopolymerized unsaturates. The solid polymer is then worked in the extruder barrel compacted and heated to a sufficiently high temperature to volatilize out substantially all of the low boiling material. This procedure delivers the solid polymer substantially free from auxiliary substances while preventing the leakage of hydrocarbon materials and preventing the induction of water vapor.

*Example 1*

A series of polymerizations were conducted using purified isobutylene cooled with solid carbon dioxide, which is soluble to the extent of more than 30% in cooled isobutylene, conducting the polymerization with gaseous boron trifluoride. The details of the resulting polymerization are well shown in the following table:

| Run No. | Charge | Refrigerant | Catalyst | Product, Mol. Wt. |
|---|---|---|---|---|
| 1 | 3 parts Iso $C_4$ | $CO_2$ | $BF_3$ | 50,200 |
| 2 | do | $CO_2$ | $BF_3$ | 55,700 |
| 3 | 3 parts Iso $C_4$ plus 1% dimer | $CO_2$ | $BF_3$ | 70,500 |
|   |   |   |   | 19,650 |
|   |   |   |   | 18,100 |
| 4 | 3 parts Iso $C_4$ plus 2% dimer | $CO_2$ | $BF_3$ | 11,940 |
| 5 | do | $CO_2$ | $BF_3$ | 11,940 |
| 6 | do | $CO_2$ | $BF_3$ | 10,060 |
| 7 | 3 parts Iso $C_4$ plus 5% dimer | $CO_2$ | $BF_3$ | 15,490 |
| 8 | 3 parts Iso $C_4$ plus 1.5% dimer | $CO_2$ | $BF_3$ | 16,790 |
| 9 | do | $CO_2$ | $BF_3$ | 15,190 |
| 10 | do | $CO_2$ | $BF_3$ | 14,970 |
| 11 | $C_4$ cut plus 5% EtO (Based on Iso $C_4$). | $CO_2$ | $BF_3$ | 6,260 |
| 12 | do | $CO_2$ | $BF_3$ | 6,480 |
| 13 | do | $CO_2$ | $BF_3$ | 6,480 |
| 14 | do | $CO_2$ | $BF_3$ | 7,300 |
| 15 | do | $CO_2$ | $BF_3$ | 7,170 |
| 16 | Iso $C_4$ plus 1.5% dimer | $CO_2$ | $BF_3$ | 13,470 |
| 17 | Iso $C_4$ plus 1.75% dimer | $CO_2$ | $BF_3$ | 11,280 |
| 18 | Iso $C_4$ plus 2.0% dimer | $CO_2$ | $BF_3$ | 11,030 |

*Example 2*

A similar series of polymerizations were conducted on mixtures of isobutylene and isoprene containing from 0.5 part of isoprene with 99.5 parts of isobutylene, up to 5 parts of isoprene with 95 parts of isobutylene, for the production of excellent rubber substitutes. These polymerizations were found to be reactive with sulphur in a curing reaction; and reactive with such substances as para quinone dioxime and its analogues and homologues in a similar curing reaction; and also with the dinitroso compounds generally. In curing these polymers they were compounded with amounts of stearic acid ranging from 1% to about 5%; with zinc oxide in amounts ranging from 1% to 10%; and amounts of various types of carbon black ranging from 10 parts to 200 parts per 100 of polymer. The resulting cured polymers showed tensile strengths within the range from 700 pounds to 4,000 pounds per square inch, elongations at break ranging from 500% to 1200% and moduli ranging from 150 pounds to 550 pounds per square inch.

Example 3

A similar series of polymerizations were conducted using mixtures of isobutylene and butadiene ranging from 15 parts of butadiene with 85 parts of isobutylene up to approximately 50 parts of butadiene with 50 parts isobutylene. These polymers yielded similar quality synthetic rubbers having much the same properties as those obtained with isoprene.

Example 4

A similar series of polymerizations were conducted utilizing mixtures of dimethyl butadiene and isobutylene and respective mixtures contained from 5% to 100% dimethyl butadiene. In these polymerizations a diversity of catalysts were used, including gaseous boron trifluoride, solutions of boron trifluoride in ethane and solutions of aluminum chloride in methyl chloride. Similar excellent rubbery polymers were obtained which cured excellently, as above outlined, to yield similar high strength, high quality elastomers.

Example 5

A similar series of polymerizations were conducted utilizing such substances as piperylene, alloocymene, myrcene, propyl butadiene ether, 2-methyl 4 nonyl butadiene 1,3 and a considerable number of similar multi-olefins and these polymerizations also yielded excellent rubber constituents. In these polymerizations in each instance there was present a major proportion of isobutylene and a minor proportion of the multi-olefin; and again a diversity of catalysts was used, including gaseous boron trifluoride, dissolved boron trifluoride, aluminum chloride dissolved in a wide range of halogenated alkyls, titanium tetra chloride, both as such and in solution, and aluminum chlorobromide dissolved in pentane to yield similar curable polymers.

Example 6

A mixture was prepared consisting of butadiene and the octene known as diisobutylene, varying proportions from 40 parts of butadiene with 60 parts of the octene to 80 parts of isobutylene with 20 parts of octene being used. In these instances the temperature was held at less reduced value, temperatures between $+10°$ C. and $-35°$ C. being used; with aluminum chloride in solution in methyl chloride as a catalyst. In each instance a hard resin was obtained which was nearly water-white in color, slightly brittle, with a melting point of approximately $100°$ C. In each instance these polymers were found to be excellent varnish resins, cooking well with linseed oil and yielding paints and varnishes of excellent heat resistance.

Thus the process and product of the invention polymerizes a cold olefinic material in a tubular reactor equipped with a movable piston for sweeping out of the reactor all of the reaction mixture and delivering it to a receiver in which the catalyst is inactivated and the reaction halted.

While there are above disclosed but a limited number of embodiments of the apparatus and process of the invention, it is possible to produce still other embodiments without departing from the inventive concept herein disclosed and it is therefore desired that only such limitations be imposed on the appended claims as are stated therein or required by the prior art.

What is claimed is:

1. A polymerizer system comprising an inclined tubular reactor member having a movable piston-type bottom, an upper opening for product discharge, supply means for delivering to said reactor liquid polymerizable unsaturates and fluid catalyst; a product receiver having an upper product receiving opening, a gas vent, and a bottom discharge opening; the upper portion of said tubular reactor opening directly into the upper portion of said product receiver, and means for reciprocating said reactor bottom alternately to enlarge the reactor volume by lowering the bottom to permit charging with liquid reactants and catalyst and then to raise the bottom to force substantially all of the resultant viscous adherent polymerization product out of the reactor into the product receiver.

2. System according to claim 1, having a movable gate adapted to slide across the product discharge opening of said reactor to close off communication between said reactor and said product receiver during the polymerization step, and when opened to permit communication therebetween after polymerization for the discharge of polymerized products.

3. A polymerization apparatus comprising in combination a flask tank product receiver having a substantially vertical side wall with a product receiving porthole in an upper portion thereof, said porthole being fitted with a slidable gate closure, an inclined cylindrical reactor vessel having a truncated upper end serving as product discharge opening, said opening fitting flush with an opening directly into the porthole of the flask tank, the reactor vessel being inclined at an angle of 30 to 75° above the horizontal and fitted with a piston-like bottom slidable upward into flush position within the porthole, means for reciprocating said reactor bottom, the inner face of the piston-like bottom being parallel to the plane of the flask tank porthole and thereby adapted to be scraped in the flush position at the top of its stroke by the slidable porthole closure, and means for opening and closing said porthole closure.

4. A polymerizer system comprising a plurality of inclined tubular reactor members each of which has a movable piston-type bottom, an upper opening for product discharge and supply means for delivering to the respective reactors liquid polymerizable unsaturates and fluid catalyst; a single product receiver having an upper product receiving opening, a gas vent, and a bottom discharge opening; the upper portion of said tubular reactors opening directly into the upper portion of said single product receiver and means for reciprocating each of said reactor bottoms alternately to enlarge the reactor volumes by lowering the bottom to permit charging with liquid reactants and catalyst and then to raise each of said bottoms to force substantially all of the resultant viscous adherent polymerization product out of the reactors into the product receiver.

References Cited in the file of this patent

UNITED STATES PATENTS

| Number | Name | Date |
|---|---|---|
| 961,350 | Hausser | June 14, 1910 |
| 1,000,732 | Hausser | Aug. 15, 1911 |
| 1,378,254 | McDonald | May 14, 1921 |
| 1,429,035 | Humphrey | Sept. 12, 1922 |
| 1,586,508 | Brutzkus | May 25, 1926 |
| 2,338,606 | Voorhees | Jan. 4, 1944 |
| 2,491,752 | Moise | Dec. 20, 1949 |